United States Patent
Kouchiyama

(10) Patent No.: US 7,225,077 B2
(45) Date of Patent: May 29, 2007

(54) VEHICLE NAVIGATION SYSTEM

(75) Inventor: Satoshi Kouchiyama, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/769,759

(22) Filed: Feb. 3, 2004

(65) Prior Publication Data

US 2004/0158400 A1    Aug. 12, 2004

(30) Foreign Application Priority Data

Feb. 4, 2003   (JP)   ............................. 2003-027129

(51) Int. Cl.
*G01C 21/32*   (2006.01)

(52) U.S. Cl. .................. 701/209; 701/200; 701/201; 701/208

(58) Field of Classification Search ........ 701/207–211, 701/213, 201; 340/995.24, 995.1, 990, 995; 455/456.5; 342/357.09; *G01C 21/00; G08G 1/123*
See application file for complete search history.

(56) References Cited

U.S. PATENT DOCUMENTS

| | | | | |
|---|---|---|---|---|
| 2,709,308 A | * | 5/1955 | Frankel et al. ................. 434/30 |
| 4,992,947 A | * | 2/1991 | Nimura et al. ............... 701/210 |
| 5,208,756 A | * | 5/1993 | Song ........................ 455/456.3 |
| 5,452,212 A | * | 9/1995 | Yokoyama et al. ......... 701/211 |
| 5,543,789 A | * | 8/1996 | Behr et al. ............. 340/995.12 |
| 5,559,707 A | * | 9/1996 | DeLorme et al. ........... 701/200 |
| 5,612,881 A | * | 3/1997 | Moroto et al. .............. 701/209 |
| 5,787,383 A | * | 7/1998 | Moroto et al. .............. 701/210 |
| 5,802,492 A | * | 9/1998 | DeLorme et al. ........ 455/456.5 |
| 5,928,308 A | * | 7/1999 | Nanba et al. ................ 701/211 |
| 5,978,733 A | * | 11/1999 | Deshimaru et al. ......... 701/209 |
| 5,991,689 A | * | 11/1999 | Aito et al. ................... 701/209 |
| 6,070,122 A | * | 5/2000 | Ishida et al. ................ 701/208 |
| 6,084,543 A | * | 7/2000 | Iizuka .................... 342/357.13 |
| 6,098,015 A | * | 8/2000 | Nimura et al. .............. 701/209 |

(Continued)

FOREIGN PATENT DOCUMENTS

EP       702209  A1 *  3/1996

(Continued)

OTHER PUBLICATIONS

Unknown, NAV Intelligent GPS NAvigation, from http://www.inavcorp.com/products/iguidances2_combo.html (14 pages).*

(Continued)

*Primary Examiner*—Cuong Nguyen
(74) *Attorney, Agent, or Firm*—Posz Law Group, PLC

(57) ABSTRACT

In a vehicle navigation system, a data storage device stores data on categories of points of interest indicated on sign boards provided at freeway exits and facilities and services available at the points of interest. The navigation system performs a search for a point of interest that provides facilities or services specified by an input from a user in a category specified by an input from the user based on the stored data. The navigation system displays an exit at which a sign board including the searched point is provided in a manner that the searched exit is distinguishable from other exit on the display device. Furthermore, the navigation system displays a route to the searched point of interest on the display device.

13 Claims, 10 Drawing Sheets

U.S. PATENT DOCUMENTS

| | | | |
|---|---|---|---|
| 6,125,323 A * | 9/2000 | Nimura et al. | 701/207 |
| 6,151,552 A * | 11/2000 | Koizumi et al. | 701/211 |
| 6,212,472 B1 * | 4/2001 | Nonaka et al. | 701/208 |
| 6,249,740 B1 * | 6/2001 | Ito et al. | 701/200 |
| 6,321,158 B1 * | 11/2001 | DeLorme et al. | 701/201 |
| 6,401,034 B1 * | 6/2002 | Kaplan et al. | 701/209 |
| 6,418,374 B2 * | 7/2002 | Sakamoto et al. | 701/209 |
| 6,421,606 B1 * | 7/2002 | Asai et al. | 701/209 |
| 6,427,118 B1 * | 7/2002 | Suzuki | 701/209 |
| 6,434,482 B1 * | 8/2002 | Oshida et al. | 701/209 |
| 6,542,814 B2 * | 4/2003 | Polidi et al. | 701/208 |
| 6,680,694 B1 * | 1/2004 | Knockeart et al. | 342/357.09 |
| 2002/0138196 A1 * | 9/2002 | Polidi et al. | 701/208 |
| 2003/0078035 A1 * | 4/2003 | Sheha et al. | 455/414 |
| 2004/0192299 A1 * | 9/2004 | Wilson et al. | 455/433 |
| 2004/0192339 A1 * | 9/2004 | Wilson et al. | 455/456.1 |
| 2004/0203901 A1 * | 10/2004 | Wilson et al. | 455/456.1 |
| 2004/0203902 A1 * | 10/2004 | Wilson et al. | 455/456.1 |
| 2004/0203903 A1 * | 10/2004 | Wilson et al. | 455/456.1 |

FOREIGN PATENT DOCUMENTS

| | | | |
|---|---|---|---|
| EP | 751376 A2 * | 1/1997 | |
| JP | 11213283 A * | 8/1999 | |
| JP | 2001108456 A * | 4/2001 | |
| JP | 2001183152 A * | 7/2001 | |
| JP | A-2002-286468 | 10/2002 | |
| JP | A-2002-297028 | 10/2002 | |
| JP | 3460033 B2 * | 10/2003 | |

OTHER PUBLICATIONS

Derwent-ACC-N0: 1981-A5762D, published on Jan. 7, 1981, Guidance system for road vehicle—uses processor in each vehicle to calculate route from movement, destination and positional data, by O. Pilsak.*

Derwent-ACC-No. 2002-181671, published on Jul. 6, 2001, Route display method for vehicle navigation device, involves determining distance of route from starting point to destination and displaying route map with linked external data stored in memory.*

Streeter La et al., A profile of drivers' map-reading abilities, Human Factors, Apr. 1, 1986 (from Dialog(R) file 81, acc. No. 42057).*

Office Action from Canadian Patent Office issued on Sep. 20, 2006 for the corresponding Canadian patent application No. 2,456,788 (a copy thereof).

* cited by examiner

FIG. 9

| | YES | NO | EITHER |
|---|---|---|---|
| J BANK ATM | ☐ | ☐ | ☐ |
| B BANK ATM | ☐ | ☐ | ☐ |
| LIQUOR | ☐ | ☐ | ☐ |
| CIGARETTE | ☐ | ☐ | ☐ |
| PARCEL | ☐ | ☐ | ☐ |
| MAILBOX | ☐ | ☐ | ☐ |
| RESTROOM | ☐ | ☐ | ☐ |
| TICKET | ☐ | ☐ | ☐ |
| PAYMENT | ☐ | ☐ | ☐ |

◀ BACK  NEXT ▶

FIG. 10

| | YES | NO | EITHER |
|---|---|---|---|
| WINDOW | ☐ | ☐ | ☐ |
| ATM | ☐ | ☐ | ☐ |
| FOREIGN EX | ☐ | ☐ | ☐ |

◀ BACK  NEXT ▶

VEHICLE NAVIGATION SYSTEM

CROSS REFERENCE TO RELATED APPLICATION

This application is based on and incorporates herein by reference Japanese Patent Application No. 2003-27129 filed on Feb. 4, 2003.

FIELD OF THE INVENTION

The present invention relates to a vehicle navigation system having a function for searching points of interest including convenience stores and gas stations.

BACKGROUND OF THE INVENTION

In a currently available vehicle navigation system, marks indicating the nearest points of interest are displayed on a map based on pre-stored position data about the points of interest. All points of interest located in the displayed area of the map are displayed in such a system. As a result, points of interest that is not easily accessible from the current position is also displayed. To resolve this problem, a navigation system in which points of interest are selectively displayed on a map is proposed in JP-A-13-116565. The points of interest are selected in consideration of the travel direction of a vehicle.

In such a system, names of exits are displayed when the vehicle is traveling on a freeway. The displayed area of the map is narrowed by displaying all exits when a number of exits exist in a short distance. Thus, it is preferable to display only exits for the selected points of interest or display them in a manner that they are distinguishable from other exits. The above-described navigation system does not provide such functions.

Moreover, certain points of interest provide different kinds of facilities and services. For example, some convenience stores provide payment services, automatic teller machines, or other services. Therefore, it will be more convenient if the navigation system has a function to display only convenience stores at which desired facilities or services are available. It will be further convenient if the navigation system has a function to display points of interest at which desired facilities or services are available regardless of their categories. For example, it will be convenient if the navigation system displays points of interest at which a restroom is available when the user is looking for a restroom. The above-described navigation system does not provide such functions.

SUMMARY OF THE INVENTION

The present invention therefore has an objective to provide a vehicle navigation system that displays a freeway exit at which a sign board indicating a point of interest that provides desired facilities or services when a vehicle is traveling on a freeway. A vehicle navigation system of the present invention performs a search for a point of interest that provides a supplemental item specified by an input from a user in a category specified by an input from the user based on stored data.

The navigation system displays an exit at which a sign board indicating the searched point of interest is provided on the display device in a manner that the searched exit is distinguishable from other exit. As a result, the user is provided with proper guidance on the exit for the point of interest.

The present invention provides another objective to provide a vehicle navigation system that displays a point of interest that provides desired facilities or services selected among the points in the same category. A vehicle navigation system of the present invention performs a search for a point of interest that provides a supplemental item specified by an input from a user in a category specified by an input from the user based on stored data.

The navigation system only displays the point of interest that provides desired facilities or services in the category. Therefore, points of interest that provide desired facilities or services in a selected category are only displayed.

The present invention provides still another objective to provide a vehicle navigation system that displays a point of interest that provides desired facilities or services regardless of category. A vehicle navigation system of the present invention performs a search for a point of interest that provides a supplemental item specified by an input from a user based on stored data.

The navigation system displays points of interest that provides desired facilities or services regardless of category. Therefore, points of interest that provide desired facilities or services are only displayed.

BRIEF DESCRIPTION OF THE DRAWINGS

The above and other objectives, features and advantages of the present invention will become more apparent from the following detailed description made with reference to the accompanying drawings. In the drawings:

FIG. 9 is an exemplary display view of a supplemental item selection screen according to the first embodiment;

FIG. 10 is another exemplary display view of a supplemental item selection screen according to the first embodiment;

DETAILED DESCRIPTION OF THE PREFERRED EMBODIMENT

The preferred embodiments of the present invention will be explained with reference to the accompanying drawings. In the following embodiment, the same numerals are used for the same components and devices.

First Embodiment

Figure 1:
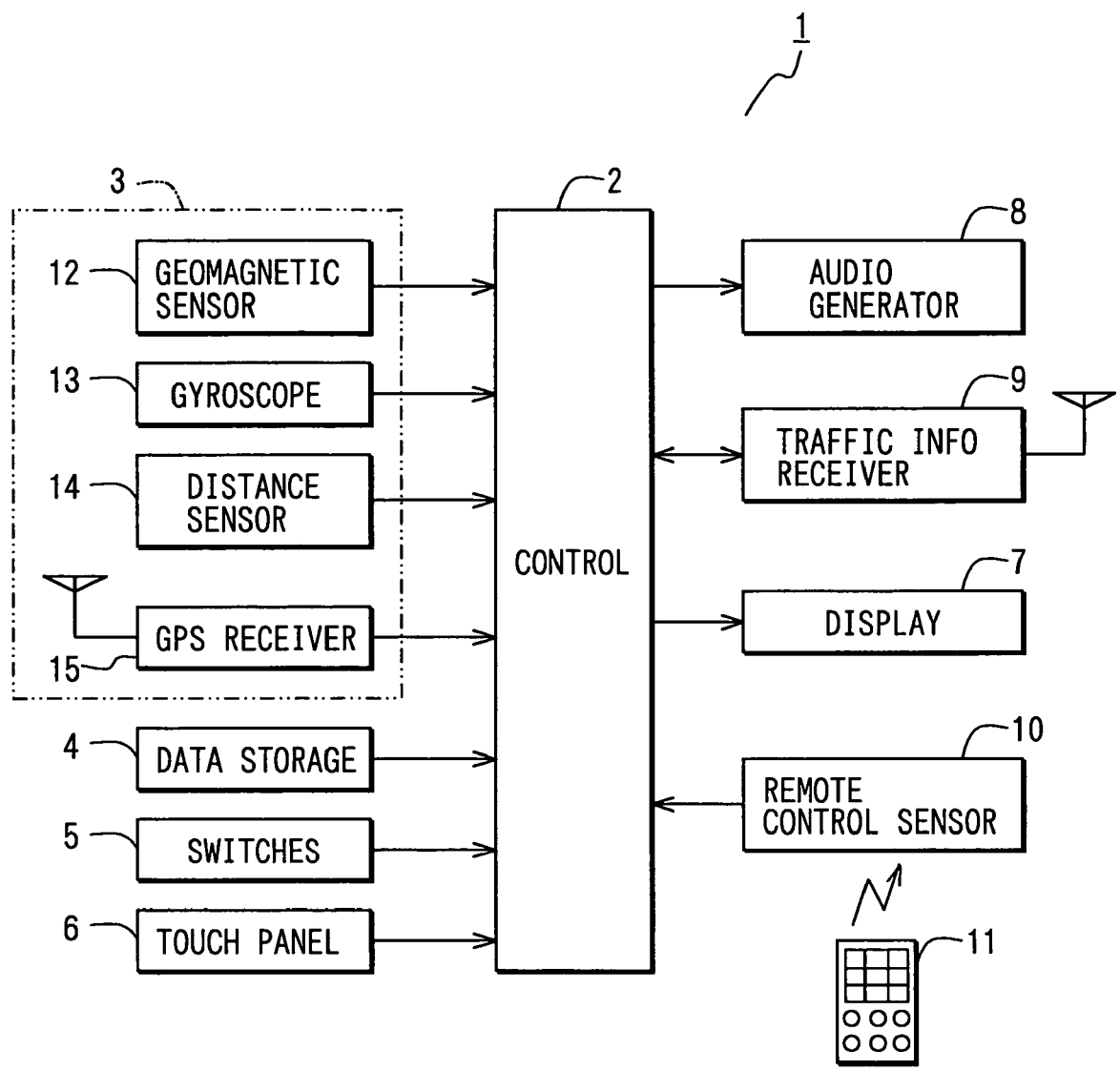
FIG. 1 is a block diagram of a vehicle navigation system showing an electrical configuration according embodiments of the present invention.

Referring to FIG. 1, a vehicle navigation system 1 includes a control circuit 2, a position detection device 3, a data storage device 4, operation switches 5, a transparent touch panel 6, a display device 7, an audio generator 8, a traffic information receiver 9, a remote control sensor 10, and a remote control 11. The control circuit 2 has a microcomputer including a CPU, a ROM, a RAM, I/Os and busses for connecting these components (all not shown). The control circuit 2 controls operation of the navigation system 1. The ROM stores programs for operating the navigation system 1 and searching desired points of interest. The RAM temporarily stores data during execution of the programs, map data retrieved from the data storage device 4, and data received via the traffic information receiver 9.

The position detection device 3 includes various sensors, such as a geomagnetic sensor 12, a gyroscope 13, a distance sensor 14, and a global positioning system (GPS) receiver 15. Although these sensors have different kinds of errors, the errors can be corrected by using them in combination. As a result, highly accurate position detection is provided. The number and the kinds of sensors can be selected according to the level of accuracy required in the position detection. All the sensors 12-15 may not be required or a steering speed sensor and wheel speed sensors may be used in combination in the position detection device 3.

The data storage device 4 includes a data storing medium, such as a DVD-ROM, and a data reader that reads data from the data storing medium. The data reader reads the data from the data storing medium and inputs it to the control circuit 2. The data includes the map data, map matching data for map matching, audio data for providing audio guidance on a route, category search data for searching a name of a destination by category.

The display device 7 includes a liquid crystal display (LCD) as a display device for displaying a map, characters, and symbols. The touch panel 6 is affixed to the LCD screen surface. The operation switches 5 are pushbutton switches and arranged around the LCD screen. Data and settings are inputted via the operation switches 5, the touch panel 6, and the remote control 11.

The traffic information receiver 9 receives road traffic information provided by the traffic information system, which is an external information source, and inputs it to the control circuit 2. The control circuit 2 determines controlled traffic areas, heavily congested roads and their heavily congested section based on the traffic information inputted from the traffic information receiver 9.

Figure 2A:
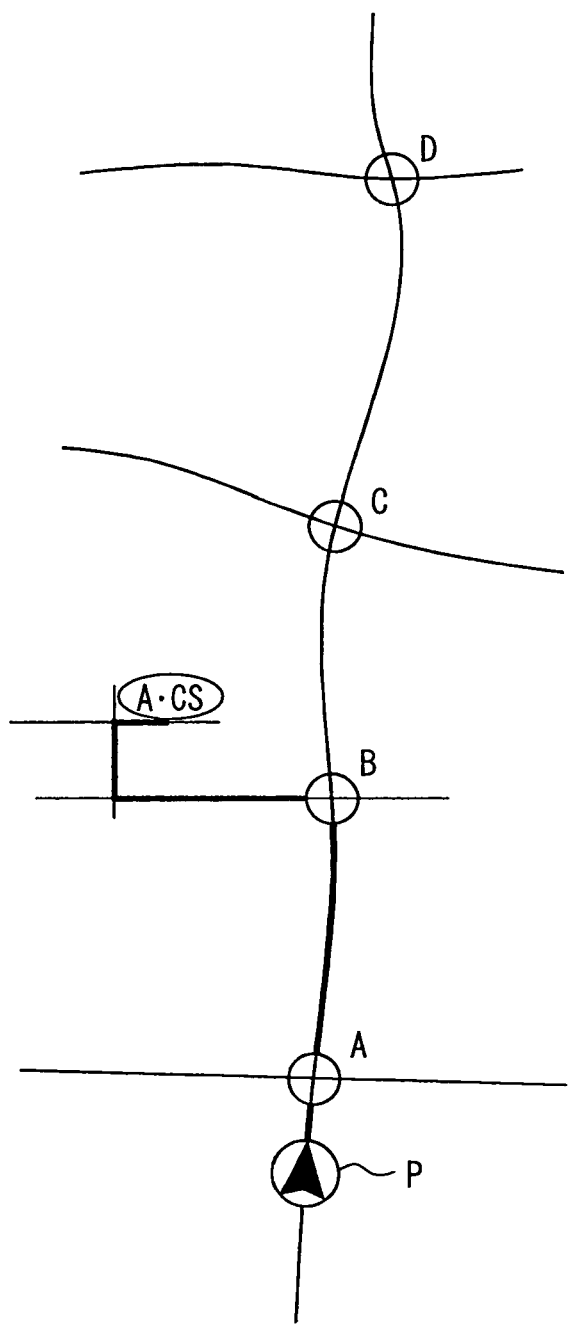
FIG. 2A is an exemplary display view of the navigation system indicating a route from a freeway to a selected point of interest according to the first embodiment.
Figure 2B:
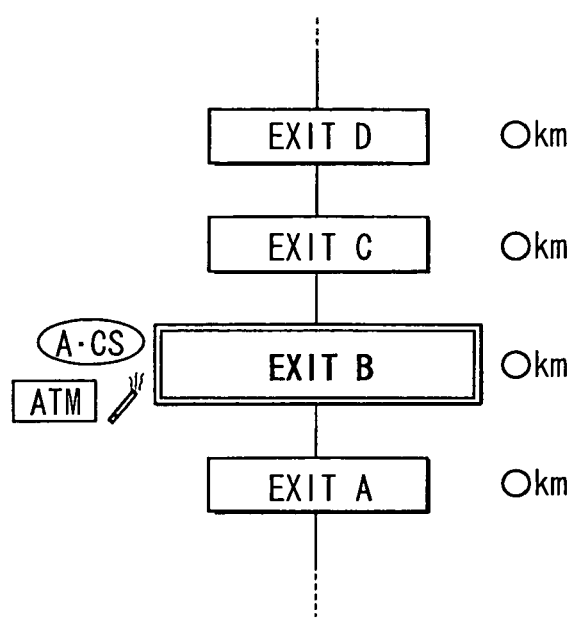
FIG. 2B is an exemplary display view of the navigation system indicating a freeway exit for the selected point shown in FIG. 2A.

The control circuit 2 has a display control function. It calculates the current position of a vehicle based on the information inputted from the position detection device 3, and displays a road map including the current position and its vicinity area. The control circuit 2 further displays a mark indicating the current position of the vehicle and a pointer P indicating the travel direction of the vehicle on the displayed map as shown in FIG. 2A. The scale of the map can be adjusted through the operation switches 5.

The control circuit 2 has functions for setting a route to a destination and for directing the user from the current position to the destination along the route with audio guidance outputted from the audio generator 8. When the destination is set, the control circuit 2 automatically sets an optimum route from the current position to the destination as a guide route. Via points may be set along with the destination. The destination and the via points can be set through the switching group 5, the touch panel 6, or the remote control 11. The guide route is indicated with a color different from a regular road color on the map displayed on the screen of the display device 7. The control circuit 2 provides the user with audio guidance on the travel direction along the route. The Dijkstra's algorithm is used for setting the optimum route.

The map data stored in the data storage device 4 is prepared for displaying a map on the display device 7. The position search data contains names of places, buildings, and facilities, and telephone numbers and their associated coordinates on the map. The position search data is used for searching a position of a point when a start point, a via point, or a destination is entered by the name or the telephone number. The category search data contains data on buildings or points of interests grouped by categories such as hotels, department stores, temples, parks, convenience stores, and gas stations.

Figure 5:
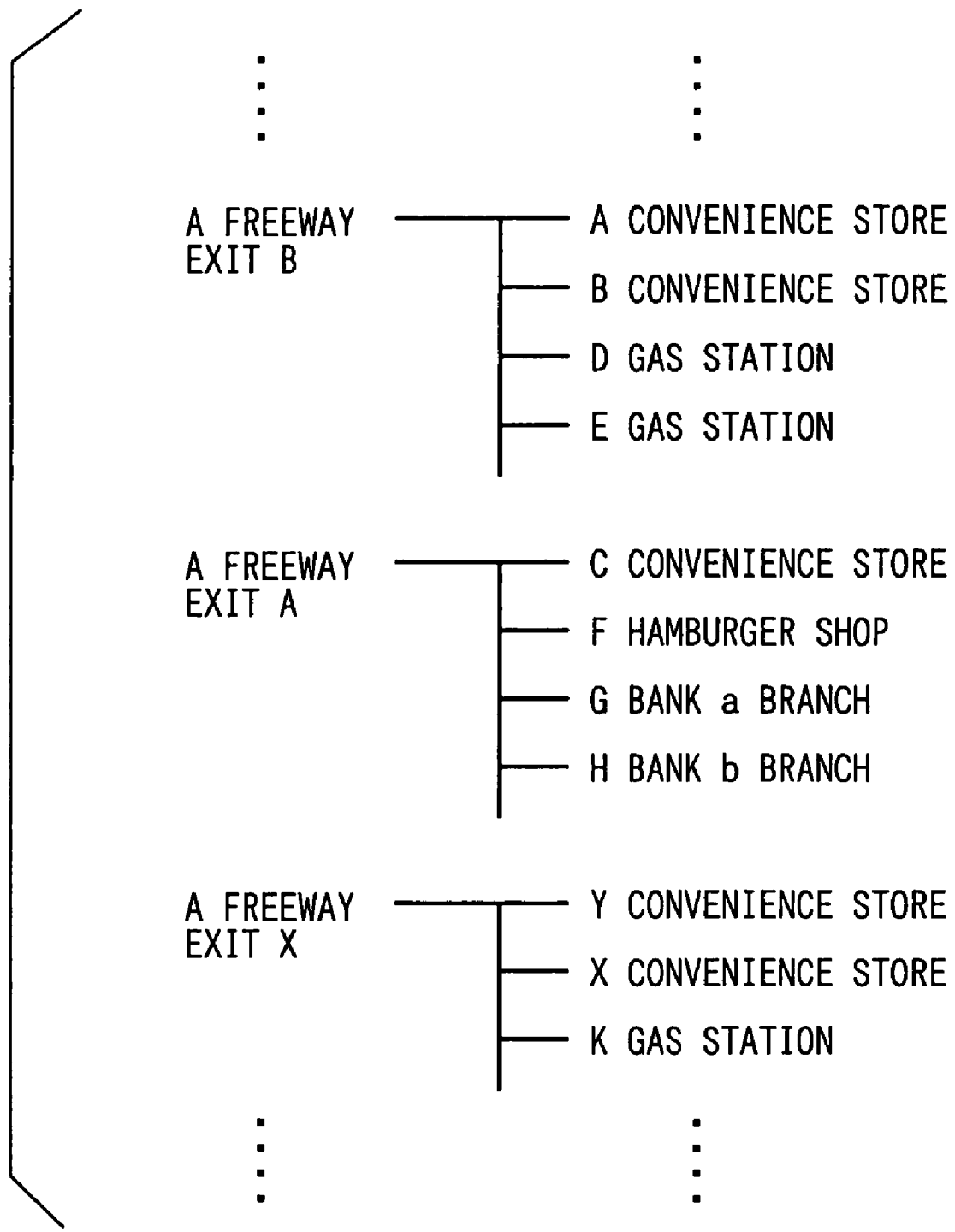
FIG. 5 is a schematic diagram showing a structure of point of interest list data according to the first embodiment.

The other data stored in the data storage device 4 includes freeway exit list data, points of interest list data, and supplemental item list data. Exits are listed in the order from the start to the end of freeways in the freeway exit list data. Points of interest indicated on sign boards at the freeway exits are listed with categories in the points of interest list data. An example of the points of interest list data is shown in FIG. 5. In this example, a sign board located at an exit X of the A freeway has signs indicating the Y convenience store, the X convenience store, and the K gas station. A sign board located at an exit A has signs indicating the C convenience store, the F hamburger shop, the a branch of the G bank, the b branch of the H bank. A sign board located at an exit B has signs indicating the A convenience store, the B convenience store, the D gas station, and the E gas station.

Figure 6:
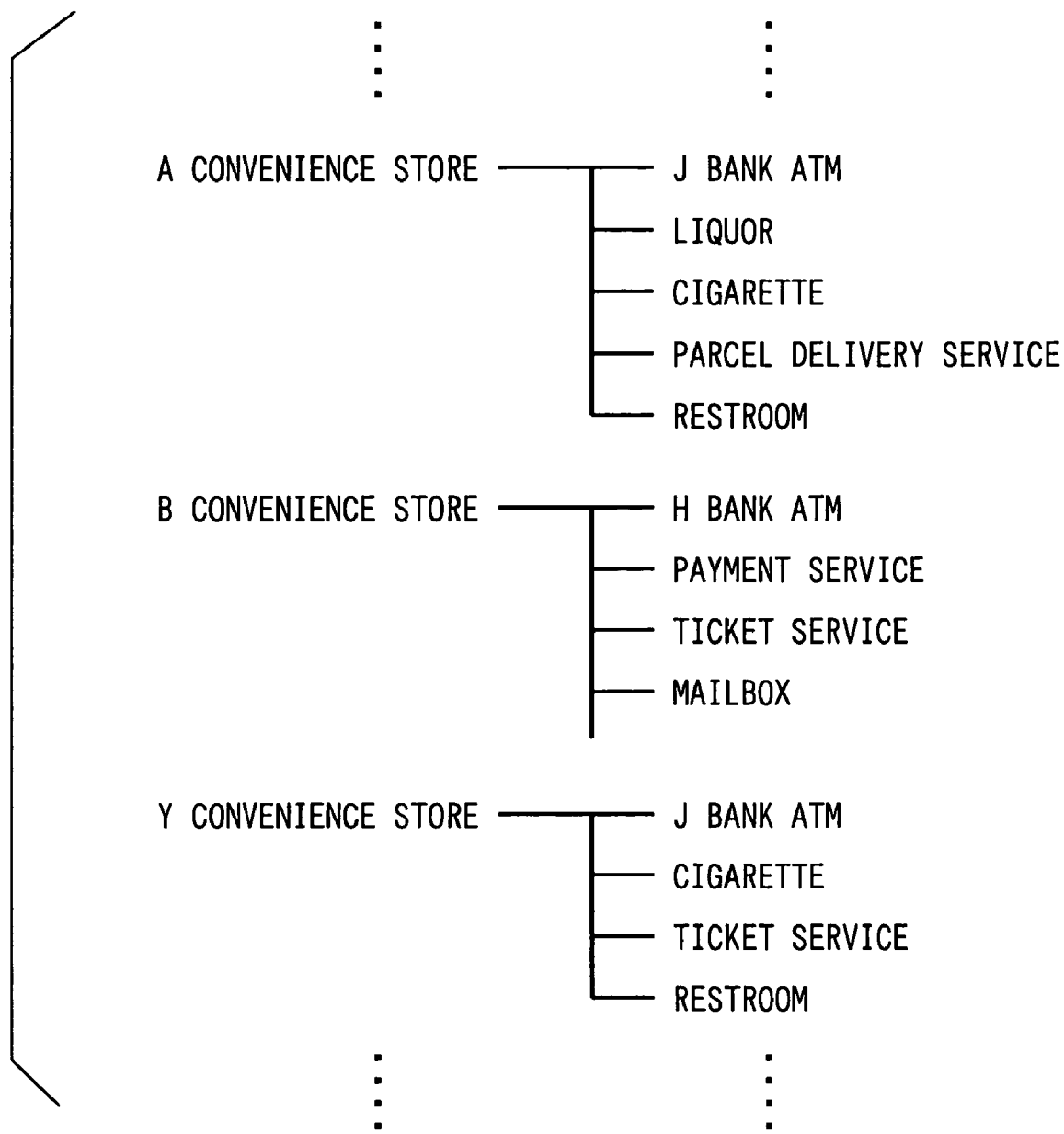
FIG. 6 is a schematic diagram showing a structure of supplemental item list data according to the first embodiment.

The supplemental item list data includes supplemental items regarding the points of interest indicated on the sign boards. The supplemental items are listed with categories, and facilities and service available at the points. An example of the supplemental item list data regarding a category of convenience stores is shown in FIG. 6. It shows that an ATM of the J bank and a restroom are available at the A convenience store. It also shows that cigarettes, liquor, and a parcel delivery service are available at the A convenience store. Likewise, a mailbox, an ATM of the H bank, a payment service, and a ticket service are available at the B convenience store. At the Y convenience store, an ATM of the J bank, a restroom, cigarettes, and a ticket service are available.

Figure 7:
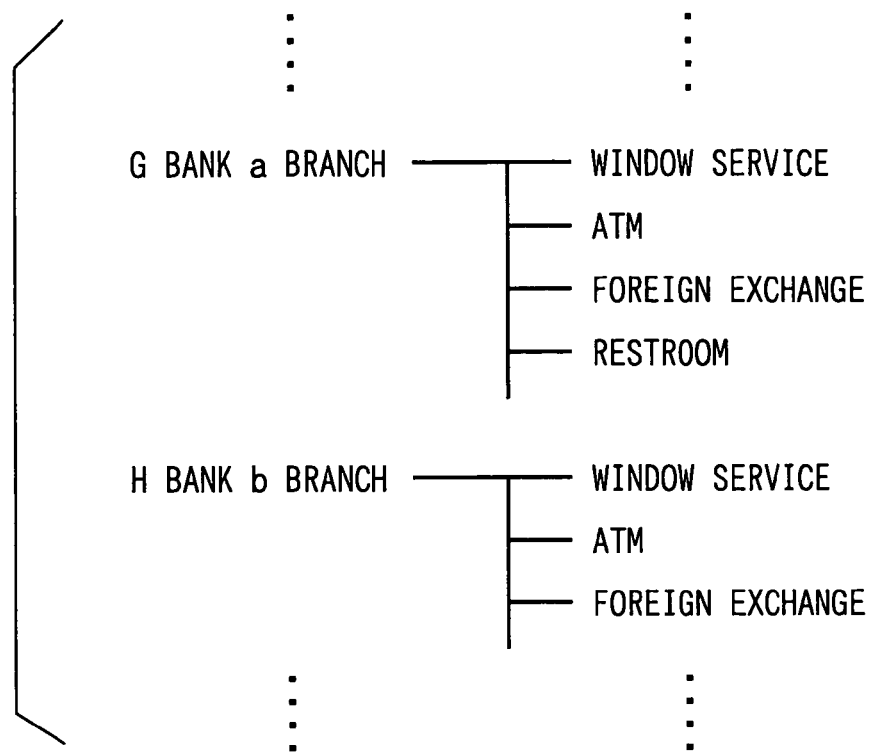
FIG. 7 is a schematic diagram showing a structure of supplemental item list data according to the first embodiment.

An example of the supplemental item list data regarding a category of banks is shown in FIG. 7. A window service, an ATM, and a foreign exchange service are available at the a branch of the J bank. The a branch also has a restroom facility. A window service, an ATM, and a foreign exchange service are available at the b branch of the H bank.

When an input specifying a category and a facility or a service is received from a user while the vehicle is traveling on a freeway, the control circuit 2 performs an exit search. First, the control circuit 2 performs a search for a point of interest that provides the specified facility or service in the specified category. It searches for the point among points of interest indicated on sign boards provided at freeway exits. Then, it performs a search for a freeway exit for the searched point and displays the exit in a manner that it is distinguishable from other exits.

Figure 8:
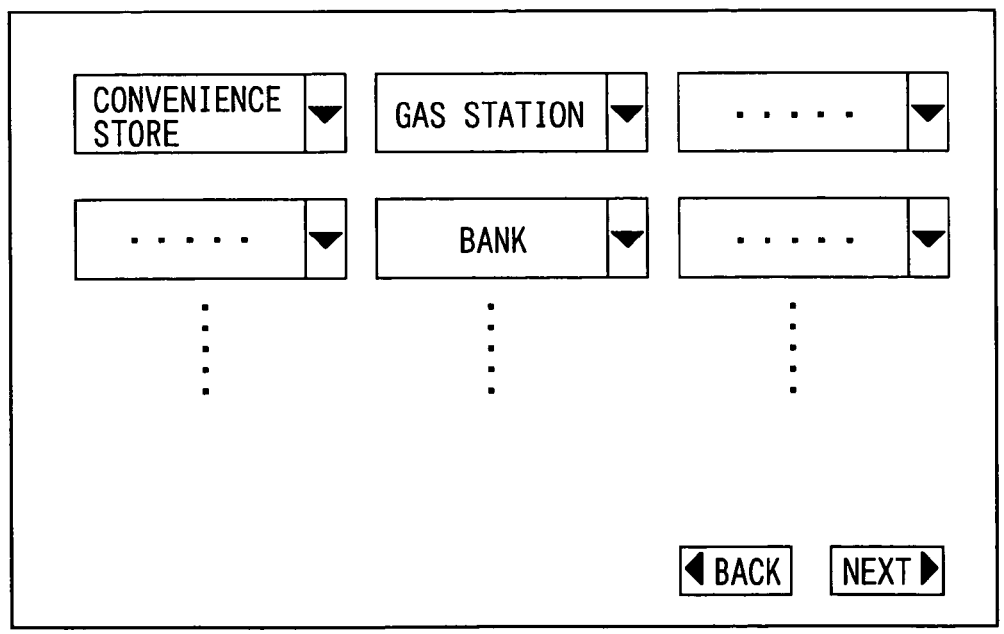
FIG. 8 is an exemplary display view of a category selection screen according to the first embodiment.

A desired category of the point can be inputted by selecting one of the categories displayed on the screen shown in FIG. 8. A desired supplemental item can be inputted by selecting one of "yes", "no", and "either" buttons on the screen shown in FIGS. 9 and 10. An example of a supplemental item selection screen in the case that a category of convenience stores is selected as a desired category is shown in FIG. 9. An example of the supplemental item selection screen in the case that a category of banks is selected as a desired category is shown in FIG. 10.

Operation of the navigation system 1 will be explained using an example. In this example, the user intends to go to a convenience store for some cigarettes and for withdrawing some money from an ATM of the J bank.

Figure 3:
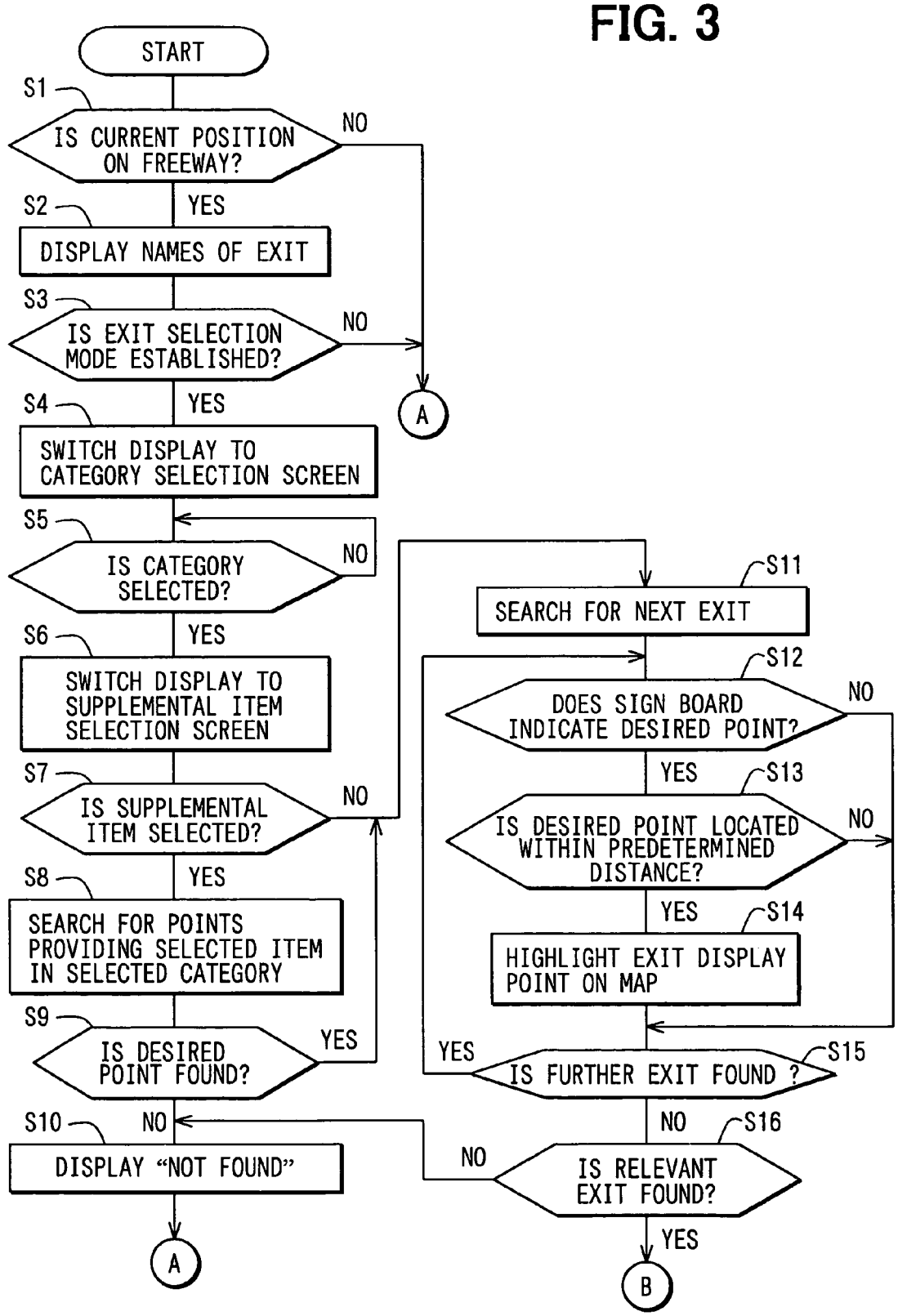
FIG. 3 is a partial flowchart showing a part of a process for an exit search according to the first embodiment.
Figure 4:
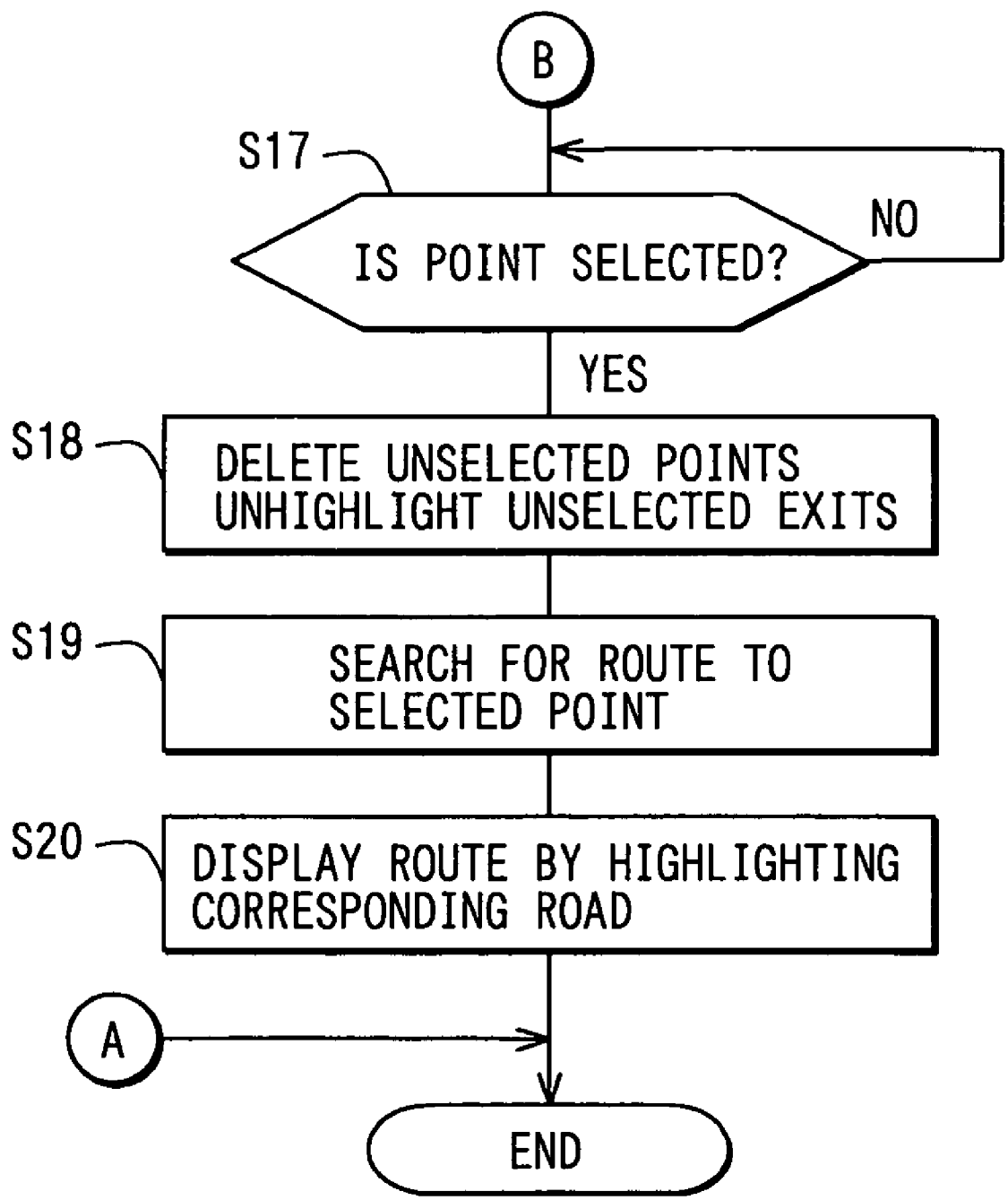
FIG. 4 is a partial flowchart showing a part of the process for the exit search according to the first embodiment.

When the navigation system 1 is turned on, the control circuit 2 calculates the current position of the vehicle based on the position data provided by the position detection device 3. Then, it retrieves the map including the current position and its vicinity from the map data stored in the data storage device 3, and displays it on the display device 7. The control circuit 2 executes an exit search routine shown in FIGS. 3 and 4 every predetermined period.

During the execution of the exit search routine, the control circuit 2 determines whether the current position of the vehicle is located on a freeway (S1). If the current position is not located on a freeway (NO), the control circuit 2 terminates the exit search routine.

When the vehicle is traveling on a freeway, the control circuit 2 determines that the current position detected by the position detecting unit 3 is located on a freeway (YES). Then, it refers to the freeway exit list data stored in the data storage device 4, retrieves the names of the exits, and displays them on the display device as shown in FIG. 1B (S2). Only the names of the exits located in the displayed area of the map is displayed on the display device in this embodiment. The names are displayed in ascending order of distance from the current position from the bottom to the top of the screen. On the right side of a box enclosing the name of the exit, the distance from the current position to the exit is displayed. Although only the names of the exits located in the map on the display device 7 is displayed in this embodiment, names of exits located outside the map on the display device 7 can be displayed.

The control circuit 2 determines whether the exit selection mode is established (S3). If the exit selection mode is not established (NO), it terminates the exit search routine.

At freeway exits, especially freeways in the United States, sign boards indicating nearby points of interest including convenience stores and gas stations are provided. It is convenient for the user if the desired point of interest is indicated on the sign board because the user recognizes the exit for the desired point.

The navigation system 1 determines whether the points of interest provide desired supplemental items, namely, facilities or services in addition to the category determination. Then, it searches relevant points of interest based on the category determination and exits at which sign boards indicating the searched points are provided. The user selects desired category and supplemental item (S3-S7) after setting the search mode to the exit search mode though the operation switches 5 or the touch panel 6.

When the exit selection mode is established through the operation switches 5 (YES at step S3), the control circuit 2 switches the displays to the category selection screen shown in FIG. 8 (S4). The control circuit 2 determines whether a category of points of interest is selected. When the user touches a portion on the right side of a convenience store box, a signal from the touch panel 6 is inputted to the control circuit 2. The control circuit 2 detects the signal and determines whether a category of convenience stores is selected based on the signal (S5). If the category is selected (YES), it switches the display to the supplemental item selection screen shown in FIG. 9 (S6). The control circuit 2 determines whether a supplemental item is selected (S7). When the user touches the YES checkbox for cigarettes and ATMs of the J bank, the control circuit 2 determines that supplemental item is selected (YES). The control circuit 2 determines the cigarettes and the ATMs of the J bank as desired facilities and services.

When the category and the supplemental item are inputted, the control circuit 2 refers to the points of interest list data including the points of interest indicated on the sing boards and the supplemental item list. The control circuit 2 searches for points of interest that provides the desired facilities or services in the category, sign boards indicating the points, and exits at which the sign boards are provided. The control circuit 2 then displays the searched points on the display device 7 and highlights the exits for distinguishing them from other exits (S8-S15).

More specifically, when the category of convenience stores is selected and the cigarette and the ATM of the J bank are selected as desired supplemental item, the control circuit 2 refers the supplemental list data in the data storage device 4. The control circuit 2 searches for convenience stores at which cigarettes and an ATM of the J bank are available from the supplemental list data (S8). The control circuit 2 determines that the A convenience store and the Y convenience store as desired points.

The control circuit 2 determines whether the desired points are found (S9). If the desired points are not found (NO), the control circuit 2 displays "not found" on the display device 7 (S10) and terminates the exit search routine. If the desired points are found (YES), the control circuit 2 searches for the next exit in the exit list data (S11). The control circuit 2 refers to the points of interest list data and determines whether the detected points are included in the points of interest indicated on the sign board at the exit.

The exit A is the first exit from the current position. The control circuit 2 determines whether the sign board at the exit A indicates the A convenience store or the Y convenience store (S12). The control circuit 2 then performs the same determination for the exits B, C, D, . . . , respectively, in the ascending order of the distance from the current position. Although the sign board at the exit X includes the Y convenience store, the vehicle has already passed the exit X. Therefore, the control circuit 2 does not display the points of interest on the sign board at the exit X, namely, it displays only relevant exits ahead of the vehicle. From the above searches, the control circuit 2 determines that the A convenience store is indicated on the sign board at the exit B.

If the requested points of interest are indicated on the sign boards (YES at step S12), the control circuit 2 searches the locations of the points on the map referring to the position search data. It determines whether the points are located within a predetermined distance from the exit (S13).

More specifically, it determines whether the A convenience store is located within the predetermined distance from the exit B, for instance, a 500 m radius of the exit B. If it is located within the distance (YES), the control circuit 2 displays a mark A·CS indicating the A convenience store on the map, and highlights the exit B for the A convenience store (S14). The exit A is highlighted by displaying it with double boxes larger than other exits as shown in FIG. 1B, and icons indicating cigarettes and the ATM of the J bank are displayed on its left.

The control circuit 2 determines whether another exit further ahead to the exit B is found (S15). If the further exit is found, the control circuit 2 repeats steps S12-S14. If the further exit is not found, the control circuit 2 determines whether the relevant exit is found (S16). If the supplemental item is not selected at step S7, the control circuit 2 executes steps S11-S15.

If a relevant exit is not found (NO at step S16), the control circuit 2 displays "not found" on the display device 7 (S10), and terminates the exit search routine. If an applicable exit is detected (YES), the control circuit 2 displays a mark indicating the point of interest on the display device 7. The control circuit 2 then determines whether the point of interest is selected (S17). When the user touches the mark, namely selects the point through the touch panel 6 (YES), the control circuit 2 recognizes the point as a selected point. If multiple points are displayed, the user can select any one of them. If more than two points are displayed as relevant points or more than two exists are highlighted as relevant exits, the control circuit 2 deletes the point(s) that is not selected (S18). Furthermore, the control circuit 2 unhighlights the exit(s) that is not selected (S18).

The control circuit 2 searches for a route to the selected point, namely, the A convenience store (S19), and displays it on the display device 7 by highlighting the corresponding roads on the map (S20). The corresponding roads may be highlighted by displaying them in darker color or with thicker lines than other roads. Then, the process is completed. The user can drives to the selected point of interest by following the route guidance provided by the navigation system 1.

The navigation system 1 highlights an exit, in the vicinity of which a point of interest that the user intends to go is located. Namely, it provides more useful visual guidance on the exit than the one that uniformly displays exit including the selected exit.

Although a sign board at a freeway exit provides a brief map from the exit to a point of interest, the user can only glance at it through a window of a traveling vehicle. The user may not be provided with information sufficient to reach the point from the sing board. The user can drive to the desired point without confusion since the route to the desired point is displayed on the display device 7.

Second Embodiment

Figure 11:
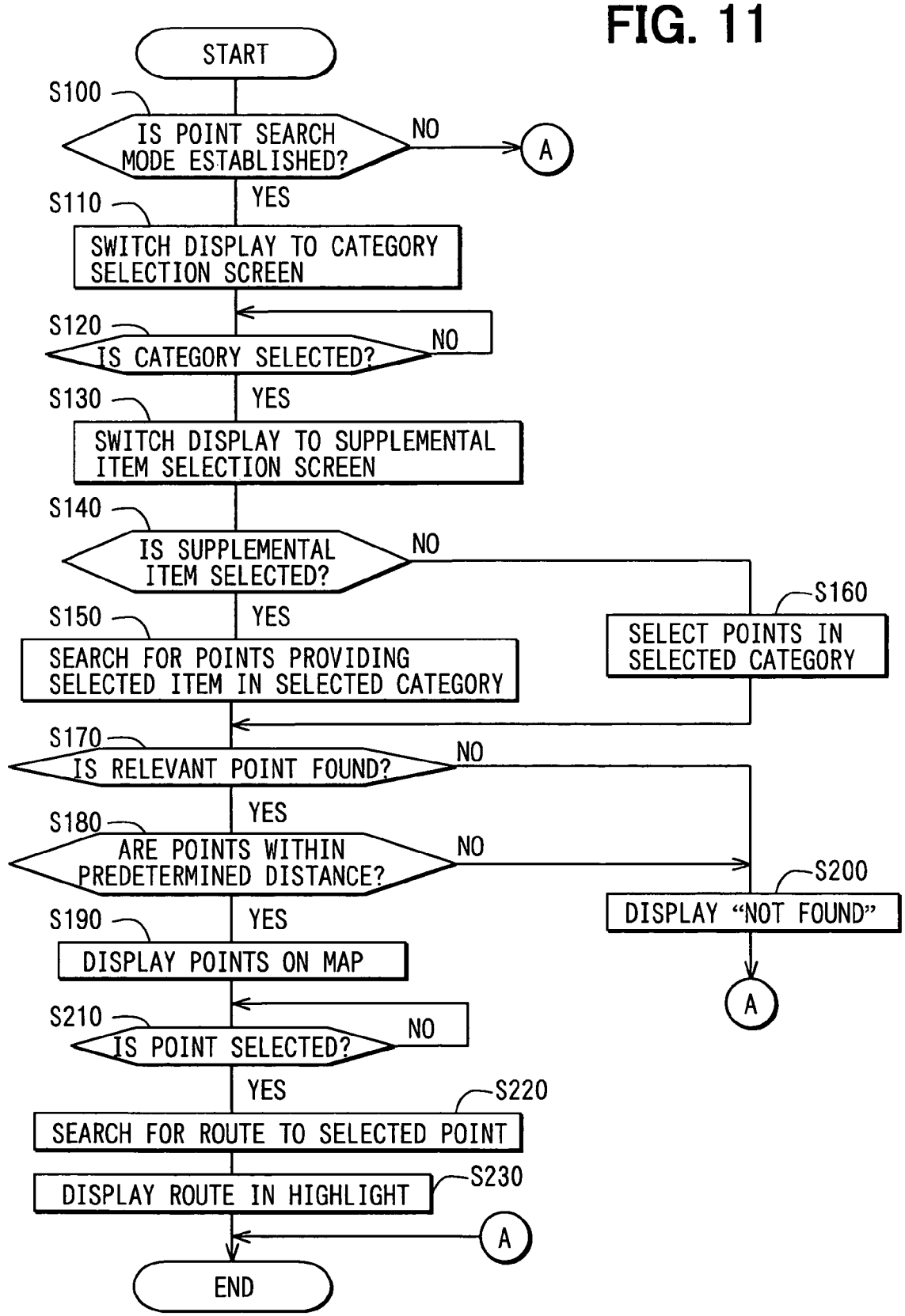
FIG. 11 is a flowchart showing a process for a point of interest search according to the second embodiment of the present invention.

Referring to FIG. 11, the navigation system 1 has a function to search a requested point of interest when the vehicle is traveling on a regular road, which is not a freeway. When the user inputs a category of a point of interest and supplemental item on facilities or services available at the point, the navigation system 1 searches a point at which the facilities or services are available in the category. The navigation system 1 displays the points on the display device 7 and searches a route from the current position to the point. Then, it displays the route on the display device 7 in a highlight manner.

In the navigation system 1, data regarding categories of points of interest and supplements information on the points displayed on the map is stored in the data storage device 4. Operation of the navigation system 1 for searching a requested point of interest in a requested category is shown in FIG. 11. The control circuit 2 determines whether a point of interest search mode is established through the operation switches 5 (S100). The control circuit 2 switches the display to a category selection screen similar to the one shown in FIG. 8 (S110). The user can selects a desired category of a point of interest from this screen. The control circuit 2 determines whether a category of a point of interest is selected (S120).

If the category is selected (YES), the control circuit 2 switches the display to a supplemental item selection screen similar to the one shown in FIGS. 9 and 10 (S130). The user can select desired facilities and services included in supplemental item on this display. The control circuit 2 determines whether the facilities or the services are selected (S140). If at least one of them is selected (YES), the control circuit 2 searches for points of interest at which the selected facilities and the services are available in the selected category based on the supplemental item list data for each point (S150). If the facilities or the services are not selected (NO), the control circuit 2 selects points of interest in the selected category (S160).

The control circuit 2 determines whether relevant points of interest are found (S170). If points are found (YES), the control circuit 2 determines whether the points are located within a predetermined distance away from the current position (S180). If the points are within the predetermined distance (YES), the control circuit 2 displays the points on the map displayed on the display device 7 (S190). If the points are not within the predetermined distance (NO), the control circuit 2 displays "not found" on the display device 7 (S200).

The control circuit 2 determines whether one of the points is selected as a desired point (S210). If one of the points is selected (YES), the control circuit searches for a route to the selected point (S220) and displays it on the display device 7 in a highlight manner (S230).

Third Embodiment

Figure 12:
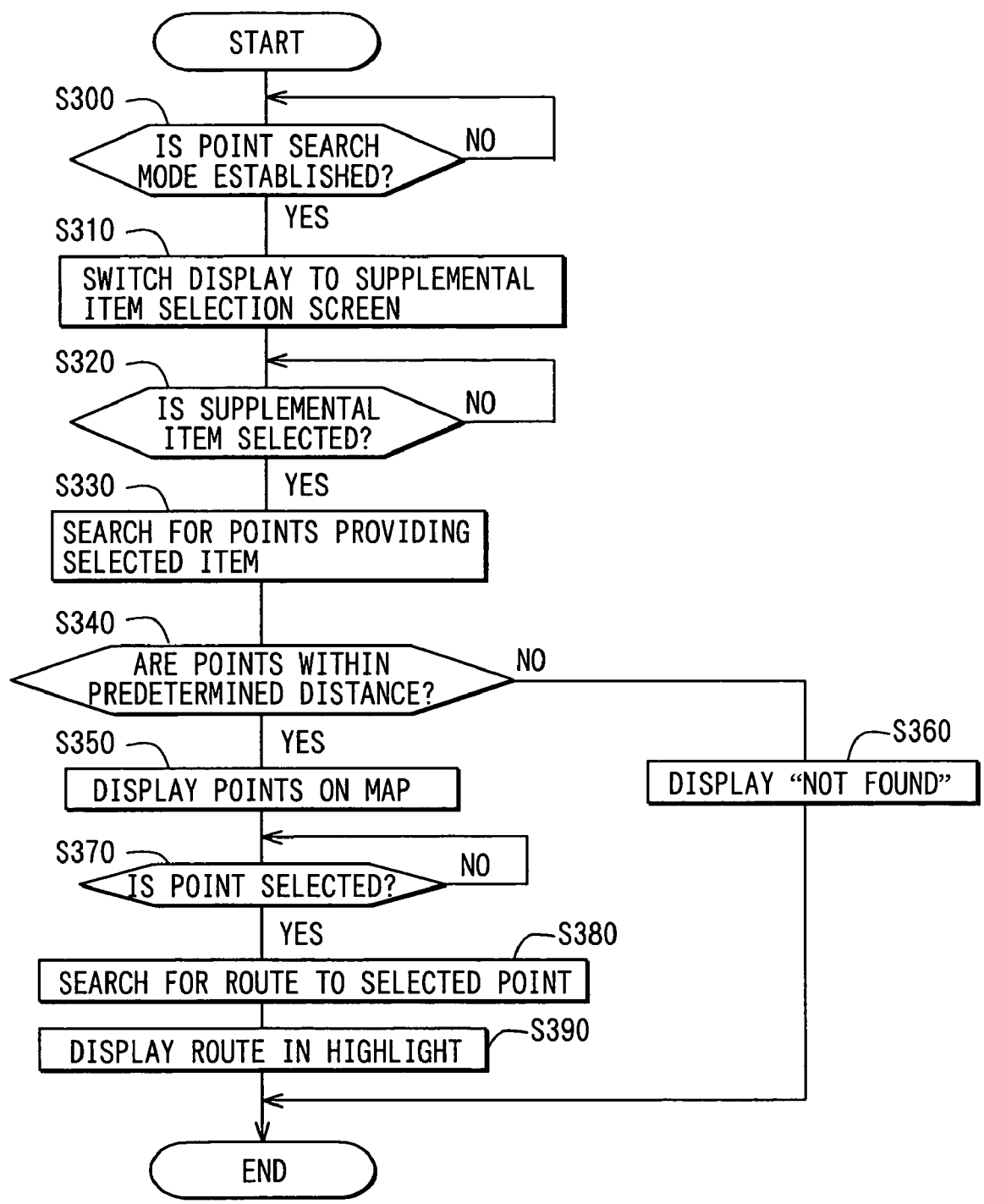
FIG. 12 is a flowchart showing a process for a point of interest search according to the third embodiment of the present invention.

Referring to FIG. 12, the navigation system 1 has a function to search points of interest at which facilities or services requested by the user are available regardless of categories of the points. Then, the navigation system 1 searches a route from the current position to the point and displays the route on the display device 7.

In the navigation system 1, data regarding categories of points of interest and supplements information on the points, which are shown in FIG. 6, displayed on the map is stored in the data storage device 4. Operation of the navigation system 1 for searching the points of interest at which desired facilities or services are available is shown in FIG. 12. The control circuit 2 determines whether the point of interest search mode is established through the operation switches 5 (S300). The control circuit 2 switches the display to a supplemental item selection screen similar to FIGS. 9 and 10 (S310). The user can select desired facilities or services though this display.

The control circuit 2 determines whether facilities or services are selected (S320). If at least one of them is selected (YES), the control circuit 2 searches for points at which the selected facilities or services are available from the supplemental item list data (S330). Then, it determines whether the points are located within a predetermined distance from the current position, for instance a 500 m radius of the current position (S340). If the points are within the predetermined distance (YES), the control circuit 2 displays the points on the map displayed on the display device 7

(S350). If the points are not within the predetermined distance (NO), the control circuit 2 displays "not found" on the display device 7 (S360).

The control circuit 2 determines whether one of the points is selected as a desired point (S370). If the desired point is selected (YES), the control circuit 2 searches for a route to the point (S380) and displays it in a highlight manner (S390).

Searching facilities or services regardless of categories of points of interest is especially useful when the user searches for a particular facility or service. For example, the user can find the nearest point at which a restroom is available regardless of categories of the points when the user would like to use a restroom.

The present invention should not be limited to the embodiment previously discussed and shown in the figures, but may be implemented in various ways without departing from the spirit of the invention. The relevant points may not be displayed on the map displayed on the display device 7 as in the first embodiment. The user can find directions to the point on the sign board on which the point is indicated in many cases. Even when the user cannot find the point with the directions, the user can set the point as a destination with the regular route search function.

Exits located within a predetermined road distance away from the current position ahead of the vehicle may be all displayed on the display device 7. Only exist for going to the point may be displayed. The current position detection device may be configured to detect the current position by transmitting GPS positioning data to an information center and receiving position data analyzed by the information center. To distinguish the relevant exit from other exit, the relevant exit may be only displayed instead of being highlighted.

The navigation system 1 may include both the exit search mode and the point of interest search mode. The navigation system 1 may includes different modes for searching an exit, a selected point of interest located adjacent to the current position in a selected category, and a selected point regardless of categories, respectively. The navigation system 1 may includes a combination of any two of the above modes.

What is claimed is:

1. A vehicle navigation system that obtains a current position of a vehicle and displays a map including the current position and vicinity thereof on a display means comprising:

data storage means for storing data on categories of points of interest, and for storing data on supplemental items regarding facilities and services that are available at the points of interest in addition to respective primary facilities and services of the points of interest as a data structure that enables the data on supplemental items to be searchable regardless of the categories of points of interest, and control means for searching for a point of interest that provides a supplemental item specified by an input from a user in a category specified by an input from a user based on the data structure stored in the data storage means; and search output means for causing only the searched point of interest to be displayed on the display means.

2. The vehicle navigation system according to claim 1, wherein the control means displays the point of interest on the display means when the point of interest is located within a predetermined distance from the current position.

3. The vehicle navigation system according to claim 1, wherein the control means searches a route to the searched point of interest and displays the route on the display means.

4. A vehicle navigation system that obtains a current position of a vehicle and displays a map including the current position and vicinity thereof on a display means comprising:

data storage means for storing data on categories of points of interest, and for storing data on supplemental items regarding facilities and services that are available at the points of interest as a data structure that enables the data on supplemental items to be searchable regardless of the categories of points of interest; and control means for performing a search on all stored points of interest, irrespective of categories of the points of interest, for a point of interest that provides a supplemental item specified by an input from a user based on the data stored in the data storage means; and search output means for causing only the searched point of interest to be displayed on the display means.

5. The vehicle navigation system according to claim 4, wherein the control means displays the point of interest on the display means when the point of interest is located within a predetermined distance from the current position.

6. A vehicle navigation system that obtains a current position of a vehicle and displays a map including the current position and vicinity thereof on a display, comprising:

a data storage device configured to store data on categories of points of interest, and configured to store data on supplemental items regarding facilities and services that are available at the points of interest in addition to respective primary facilities and services of the points of interest as a data structure that enables the data on supplemental items to be searchable regardless of the categories of points of interest, and a control circuit in communication with the data storage device and configured to search for a point of interest that provides a supplemental item specified by an input from a user in a category specified by an input from a user based on the data structure stored in the data storage device, the control circuit further being configured to cause the searched point of interest to be displayed on the display.

7. The vehicle navigation system according to claim 6, wherein the supplemental items comprise facilities and services available at one or more of gas stations, restaurants, convenience stores and banks.

8. The vehicle navigation system according to claim 1, wherein the supplemental items comprise facilities and services available at one or more of gas stations, restaurants, convenience stores and banks.

9. The vehicle navigation system according to claim 4, wherein the supplemental items comprise facilities and services available at one or more of gas stations, restaurants, convenience stores and banks.

10. The vehicle navigation system according to claim 6, wherein the supplemental items comprise one or more of a bank ATM, liquor sales, cigarette sales, a parcel delivery service, a restroom, a payment service, a ticket service, a mailbox, a bank window service and a foreign currency exchange.

11. The vehicle navigation system according to claim 1, wherein the supplemental items comprise one or more of a bank ATM, liquor sales, cigarette sales, a parcel delivery service, a restroom, a payment service, a ticket service, a mailbox, a bank window service and a foreign currency exchange.

12. The vehicle navigation system according to claim 4, wherein the supplemental items comprise one or more of a bank ATM, liquor sales, cigarette sales, a parcel delivery service, a restroom, a payment service, a ticket service, a mailbox, a bank window service and a foreign currency exchange.

13. The vehicle navigation system according to claim 4, wherein the control means searches a route to the searched point of interest and displays the route on the display means.

* * * * *